United States Patent [19]

Feuerstacke

[11] Patent Number: 5,555,259
[45] Date of Patent: Sep. 10, 1996

[54] PROCESS AND DEVICE FOR MELTING DOWN OF SCRAP

[75] Inventor: Ewald Feuerstacke, Dorsten, Germany

[73] Assignee: Mannesmann Aktiengesellschaft, Dusseldorf, Germany

[21] Appl. No.: 424,413

[22] PCT Filed: Oct. 25, 1993

[86] PCT No.: PCT/DE93/01025

§ 371 Date: May 31, 1995

§ 102(e) Date: May 31, 1995

[87] PCT Pub. No.: WO94/10348

PCT Pub. Date: May 11, 1994

[30] Foreign Application Priority Data

Oct. 26, 1992 [DE] Germany .................... 42 36 510.4

[51] Int. Cl.⁶ .................................................. F27D 13/00
[52] U.S. Cl. ............................ 373/80; 373/82; 373/94; 373/111
[58] Field of Search .................... 373/44, 45, 52, 373/79, 80, 81, 82, 94, 111

[56] References Cited

U.S. PATENT DOCUMENTS

| | | | |
|---|---|---|---|
| 3,919,454 | 11/1975 | Langhammer | 373/80 |
| 4,001,008 | 1/1977 | Stift | 75/11 |
| 4,691,900 | 9/1987 | Maeda | 266/156 |

FOREIGN PATENT DOCUMENTS

| | | |
|---|---|---|
| 0336920 | 10/1989 | European Pat. Off. . |
| 2210468 | 9/1973 | Germany . |
| 2342959 | 2/1975 | Germany . |
| 3701678 | 8/1988 | Germany . |

*Primary Examiner*—Tu Hoang
*Attorney, Agent, or Firm*—Cohen, Pontani, Lieberman, Pavane

[57] ABSTRACT

A process and device for melting scrap in a direct current-driven closed shaft furnace. The scrap is fed with an annular cross-section into one end of the furnace and hot gases which flow against the falling scrap are sucked below the scrap feeding area via an outer cylindrical wall of the scrap column. The inner free surface of the ring-shaped flat cross-section of the scrap is reduced before the scrap reaches the melting zone. In the melting zone, the scrap is exposed to an electric arc at the center of the flat cross-section. The arc furnace has a cathode that is held by an electrode bearing device which is formed as a concentric pipe with respect to the central axis of the furnace vessel. At one end the pipe is conically tapered and at the other end it is supported on the shaft of the furnace by bearing arms.

14 Claims, 2 Drawing Sheets

PROCESS AND DEVICE FOR MELTING DOWN OF SCRAP

BACKGROUND OF THE INVENTION

1. Field of the Invention

The present invention related relates to a process and an apparatus for melting down of scrap in a shaft furnace which is operated with direct current.

2. Description of the Prior Art

The cathodes of direct current arc furnaces are customarily supported by a support arm which is fastened on a vertically movable support column. The disadvantage of this manner of constructing electrode supporting devices for arc furnaces such as known, for instance, from DE 37 01 678, is the large free length of electrode present with only a small height of the shaft of the furnace vessel. The greater the structural height of the furnace vessel, the greater also the danger of the scrap falling against the free part of the electrode resulting in the breaking of the electrode as well as short circuits. This has the negative consequence of an interruption in the transmission of power.

SUMMARY OF THE INVENTION

In addition, such furnaces are generally charged batchwise, so that there are interruptions in operation for opening the cover and removing the electrodes. The result of this is not only a reduction in production but also an increase of the wear in the furnace parts, including wear of the refractory lining as well as of the cathode which extends into the furnace vessel.

From German Patent 22 10 468, a process is known for the continuous production of steel in a shaft furnace at the bottom of which a centrally arranged electrode which extends into the furnace vessel. The electrode melts the charge of material arranged above it with an arc. A shaft furnace of this construction which is intended for melting down ore, pellets and sinter is scarcely suitable for melting down scrap. On the one hand, the necessary power cannot be introduced into the burden, while, on the other hand, the bottom electrode, which is surrounded by a slot, entails excessive risks with the level of molten bath customary with the melting of scrap.

From EP 0 336 920, a process is known for the charging, inter alia, of scrap in a melting or reduction-melting furnace in which the burden is preheated before being introduced into the furnace and is held, using an electromagnetic field, until a predetermined temperature has been reached. In this case, the burden is subjected directly to the heat of radiation and the process heat, namely to such an extent that, for instance, the scrap loses its ferromagnetic properties (Curie point) and can no longer be held by the electromagnetic field.

This melting furnace, which is designed for a continuous process, does not permit holding the column of scrap back in the furnace shaft.

The object of the present invention is to provide an arc furnace of this type which, with structurally simple means, permits substantially continuous operation and in which the energy necessary for melting can be used as efficiently as possible and in which a cathode requiring little maintenance regardless of the height of the shaft can be employed.

Pursuant to this object, one aspect of the present invention resides in the process for melting down scrap in a closed shaft furnace operated by direct current, which process includes charging the scrap into an annular chamber at a first end of the furnace so that the scrap descends into the furnace in a column with an annular flat cross-section that defines an inner scrap-free area, drawing off heating gases which flow through the scrap opposite to the scrap descending direction from an outer cylindrical wall of the annular column of the scrap, reducing the inner scrape-free area before the scrap reaches a melt zone, melting the scrap down in the melt zone with an arc burning between a cathode and an anode by subjecting the scrap to the arc at a center of the flat cross-section, and tapping off melted products in a bottom region of a vessel arranged at the bottom end of the shaft furnace. Another aspect of the present invention resides in an arc furnace for carrying out the inventive process, which furnace includes a shaft, of direct current cathode that extends into the vessel, the vessel having tap holes for discharging of the slag and/or metallic melt, an anode provided in a bottom of the vessel, means for drawing off flue gas provided at a top end of the shaft, and an electrode support arranged at the top end of the shaft for holding the electrode. The electrode support includes a pipe arranged concentrically to a center line of the shaft. The electrode support further has support arms connected between the shaft and a top end of the pipe. The pipe has a bottom end that is conically tapered while the drawing off means is a flue gas duct arranged at the top end of the shaft so as to surround the shaft.

In accordance with the present invention, it is proposed that the column of scrap be developed in the form of a sleeve and that, in this connection, the scrap be allowed to descend vertically in the shaft in a flat cross section. The free inner space of the sleeve consisting of descending scrap is reduced before the melting zone is reached, and the inner hollow space of the sleeve of scrap is subjected to arc burning between a cathode and an anode.

In order to permit the completely uniform descent of the scrap, a furnace vessel is provided in the center of which the electrode is arranged within a pipe. The continuously chargeable scrap has an annular surface in a cross-sectional plane at right angles to the center line of the vessel. Despite the centrally burning arc, inclined embankments are not produced within the annular surfaces during the descent of the scrap, so that the individual cross sections remain uniformly flat.

The mounting of the electrode is provided within the pipe so that a short free end of electrode remains and at the same time the mount is in protected position, so that the electrode is not subjected, in particular, to the radiant heat of the arc or of the melt. This electrode end of low breakage is independent of the height of the shaft.

The top of the shaft furnace is completely free except for a covering, so that charging can be effected from any side in an unrestricted manner. In this way, it is possible to add charge at any desired places of the column of scrap and thus to form a completely flat column of scrap.

In addition to the electric melting energy, burners for gaseous and/or powdered fuels can also advantageously be used.

The flue gases leaving the furnace are drawn off while still in the region of the column of scrap through an annularly arranged waste-gas are fed for gas purification.

Furthermore, a device is provided for interrupting the discharge of the column of scrap so that the necessary slag work can be effected without the continuous sliding down of the scrap, with the result of further metallic melting.

In one advantageous embodiment, this stopping device is developed in the form of a magnet. This magnet is arranged both on the outer shell of the shaft and within the inner free space of the pipe. By this arrangement, a maximum magnetic holding force can be developed, the free surface between the two magnets to be overcome being relatively small due to the sleeve shape of the column of scrap as compared with known structural forms of furnaces.

In another embodiment, the stopping device consists of simple mechanical elements which are movable in rotation or axially and reduce the cross section of passage. These mechanical stopping elements, in the form of bars or plates, can be introduced by simple drives into the shaft space of the furnace and/or are movable back and forth in the shaft itself relative to the wall. The mechanical elements achieve an essential part of their holding work by the clamping of individual pieces of scrap against each other.

In order to reduce the losses of electric energy, the feeding of the current is effected though a connecting duct between the pipe wall and the shaft wall. Due to the only slight vertical changes in the electrode, the equalization in length of the current pipes can be obtained by a simple circular guidance. The clamping of the current feed to the electrode is effected in a protected position remote from the tip of the electrode.

The electrode is supported on lift cylinders. Since no scrap can fall against the electrode, there are furthermore no short circuits, with the result that relatively slow short-stroke hydraulic units can be used in the furnace of the invention.

One embodiment of the invention is shown in the accompanying drawing:

DETAILED DESCRIPTION OF THE PREFERRED EMBODIMENTS

Figure 1:
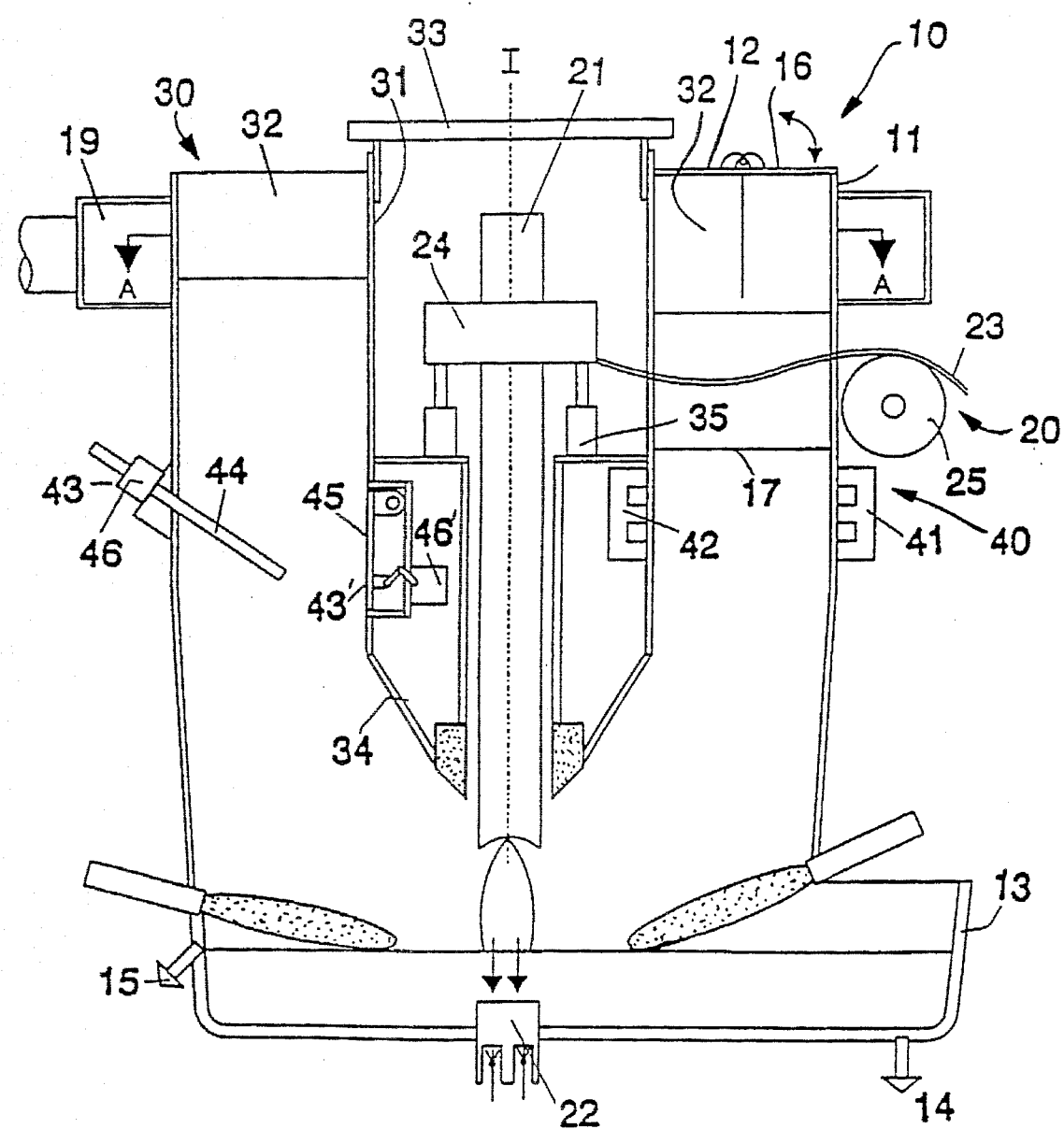
FIG. 1 is a section through the furnace vessel of the present used invention.

FIG. 1 diagrammatically shows a shaft furnace 10 having a shaft 11 which can be closed by a cover 12. Flaps 16, which are opened for charging the furnace 10 are provided on the cover 12.

In the lower vessel 13 of the shaft furnace 10 there is a tap hole 14 for metal and a tap hole 15 for slag. An anode 22 is arranged in the bottom of the lower vessel 13.

In the center of the shaft furnace 10 there is an electrode support device 30 which has a pipe 31 which rests, via support arms 32, on the shaft 11 of the shaft furnace 10. At its head end, the pipe 31 is closed by a cover 33. At the base end of the pipe 31, there is a conical taper 34 extending towards the lower vessel 13.

Within the pipe 31 there are support elements 35 on which clamping jaws 24 rest.

By these clamping jaws 24, a cathode 21 which is arranged within the pipe 31 and extends out of the base end thereof is clamped. The cathode 21, which forms part of a direct-current, is supplied with electrical energy via a lead or feed line 23. The lead 23 is in this connection conducted over a guide roll 25.

Within a region at the mid-point of the height of the shaft 11, there is a device 40 for stopping the scrap which can be charged into the shaft. On the right-hand part of the shaft 11 the stop device 40 is constructed as an external magnet 41 and an internal magnet 42. On the left side of the shaft 11 the stopping device 40 is developed in the form of mechanical means 43, 43' having rods 44 or plates 45 which can be moved by drives 46, 46'. At the to pend of the shaft furnace 10 there is a flue gas duct 19 which surrounds the shaft 11 and is in communication with a flue-gas purification device, not further shown.

Below the flue-gas duct 19, within the shaft 11, a connecting line 17 is provided between the pipe 31 and the wall of the shaft 11, through which line the energy supplies for the support elements 35, the clamping jaws 24, and the current supply for the cathode 21 can extend.

Figure 2:
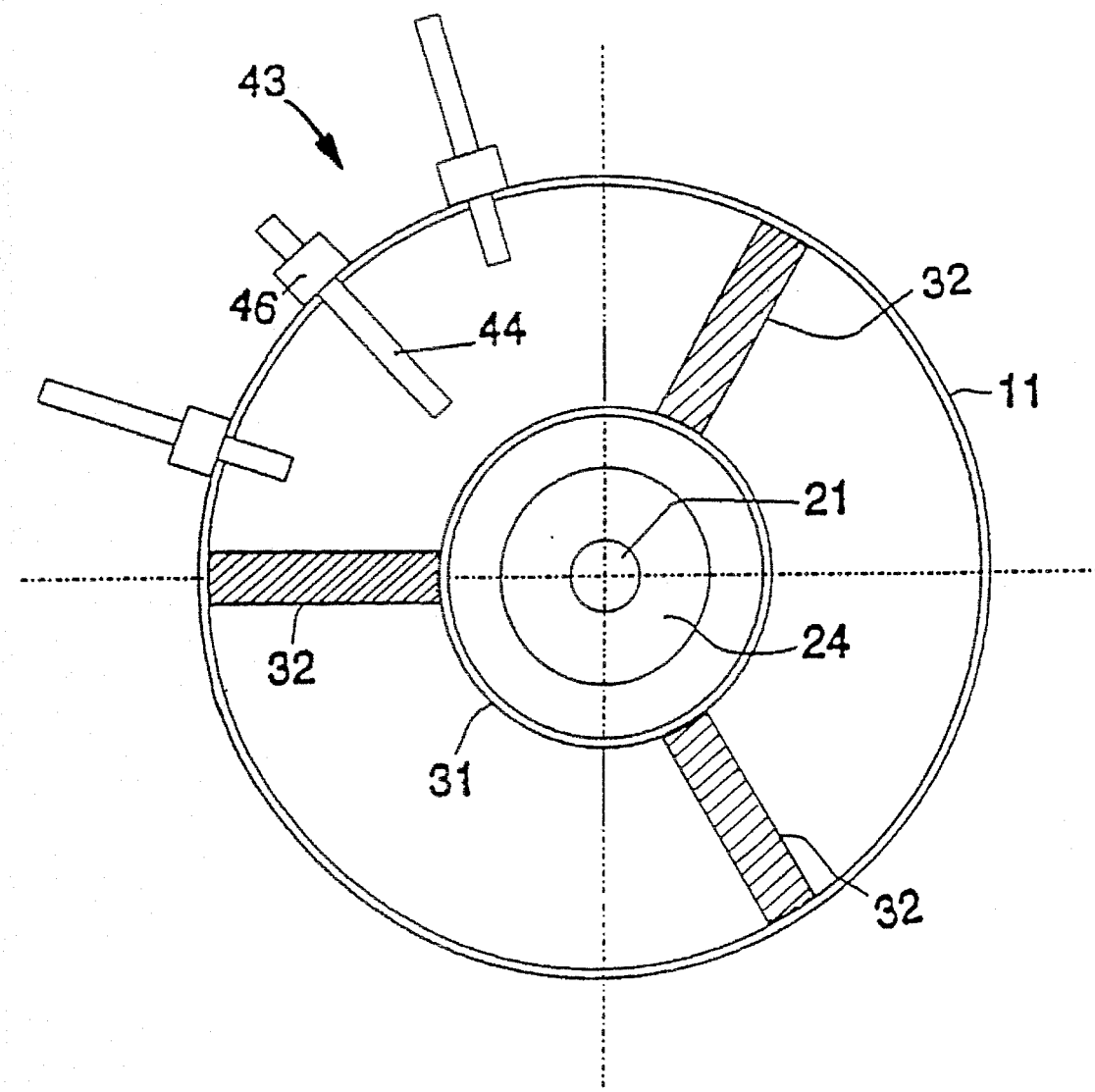
FIG. 2 is a top view along the line A—A of FIG. 1.

FIG. 2 is a top view of the shaft 11 (section AA). In the center of the shaft 11 there is arranged the cathode 21, which is held by the clamping jaws 24. Shown in section are three support arms 32 which are fastened at one end to the pipe 31 and at the other end to the shaft 11.

Of the stopping devices 40 proposed, only the mechanical means 43 in the form of rods 44 which are displaceable by drives 46 are shown in FIG. 2.

I claim:

1. A process for melting down scrap in a closed shaft furnace operated with direct current, comprising the steps of:

charging the scrap into an annular chamber at a first end of the furnace so that the scrap descends into the furnace in a column with an annular flat cross-section that defines an inner scrap-free area;

drawing off heating gases which flow in a direction opposite to the scrap descending in the annular chamber from an outer cylindrical wall of the annular column of scrap, substantially at the first end of the furnace;

reducing the inner scrap-free area before the scrap reaches a melt zone;

melting the scrap down in the melt zone with an arc burning between a cathode and an anode, the melting including subjecting the scrap to the arc at a center of the flat cross-section;

tapping-off melted products in a bottom region of a vessel arranged at a bottom end of the shaft furnace;

interrupting the descent of the scrap at a mid-point of the shaft furnace; and removing slag from the vessel.

2. A process according to claim 1, wherein the melting step includes melting the scrap with a flame in the melt zone on an outer edge of the flat cross-section in addition to melting with the arc.

3. An arc furnace, comprising:

a shaft;

a vessel at a bottom end of the shaft, the vessel having tap holes for discharging at least one of slag and metallic melt;

a cathode extending into the vessel and operated with direct current;

an anode provide in a bottom of the vessel;

means connected at a top end of the shaft for drawing-off flue gas; and an electrode support arranged at the top end of the shaft for holding the cathode, the electrode support including a pipe arranged concentrically to a center line of the shaft, the pipe having a bottom end that is conically tapered, the electrode support further including support arms connected between the shaft and a top end of the pipe, the drawing-off means including a flue-gas duct arranged at the top end of the shaft so as to surround the shaft.

4. An arc furnace according to claim 3, and further comprising support elements for the cathode, the support elements being provided in the pipe so as to permit a change in position of the cathode in an axial direction.

5. An arc furnace according to claim 4, wherein the support elements include at least three displacement cylinders operated with a flame-proof hydraulic fluid.

6. An arc furnace according to claim 3, and further comprising means for stopping scrap from descending in the shaft, the stopping means being provided in a region of a mid-height point of the shaft.

7. An arc furnace according to claim 6, wherein the stopping means includes a magnet arranged in a sectional plane of the shaft, the magnet having at least two parts including a first part arranged to surround the shaft on an outer wall of the shaft, and a second part arranged on an inner wall of the pipe.

8. An arc furnace according to claim 6, wherein the stopping means is a mechanical means which includes rods provided to be moveable into an interior region of the shaft.

9. An arc furnace according to claim 6, wherein the stopping means is a mechanical means which includes plates provided to be moveable into an interior region of the shaft.

10. An arc furnace according to claim 8, wherein the rods are fastened to the shaft in an axially moveable manner, the stopping means further including drives arranged outside the shafts for moving the rods into and out of the shaft.

11. An arc furnace according to claim 5, wherein the plates are fastened to the pipe so as to be pivotably moveable, the stopping means further including drives arranged within the pipe for moving the plates into and out of the shaft.

12. An arc furnace according to claim 8, wherein the rods are fastened to one of the shaft and the pipe so as to be freely rotatable so that the rods can be pressed against the column of scrap present in the shaft.

13. An arc furnace according to claim 9, wherein the plates are fastened to one of the shaft and the pipe so as to be freely rotatable so that the plates can be pressed against a column of scrap in the shaft.

14. An arc furnace according to claim 3, and further comprising a connecting conduit connected between the pipe and a wall of the shaft so as to form a passage, and an electric feed line arranged to pass through the connecting conduit for providing electricity to the cathode.

* * * * *